United States Patent [19]

Noguchi et al.

[11] Patent Number: 4,698,980
[45] Date of Patent: Oct. 13, 1987

[54] APPARATUS FOR CONTROLLING VEHICLE AIR CONDITIONER

[75] Inventors: Kazuo Noguchi; Shinichi Ooi, both of Saitama, Japan

[73] Assignee: Diesel Kiki K.K., Tokyo, Japan

[21] Appl. No.: 929,731

[22] Filed: Nov. 12, 1986

[30] Foreign Application Priority Data

Dec. 16, 1985 [JP] Japan ............................ 60-193372
Jan. 13, 1986 [JP] Japan ............................ 61-004725

[51] Int. Cl.$^4$ ........................................... F25D 17/08
[52] U.S. Cl. ........................................ 62/179; 62/244; 74/96; 236/49; 165/43
[58] Field of Search ............ 236/13, 49 D; 62/244, 62/179, 186; 165/16, 42, 43; 237/2 A; 74/96

[56] References Cited

U.S. PATENT DOCUMENTS

| | | | |
|---|---|---|---|
| 3,684,170 | 8/1972 | Roof | 236/490 X |
| 4,272,015 | 6/1981 | Houser | 236/49 D |
| 4,355,681 | 10/1982 | Shimada et al. | 236/13 X |
| 4,381,074 | 4/1983 | Oijima et al. | 165/43 X |
| 4,518,032 | 5/1985 | Fumasaki et al. | 236/49 D X |
| 4,580,620 | 4/1986 | Fukumoto et al. | 165/40 X |
| 4,611,755 | 9/1986 | Miyanaga et al. | 236/13 |

Primary Examiner—William E. Tapolcai
Attorney, Agent, or Firm—Yusuke Takeuchi

[57] ABSTRACT

An apparatus for controlling a vehicle air conditioner having a speed setting mechanism interconnected to the output shaft of an actuator for turning an air mixing shutter so as to switch the blower between low and high speed operations. The cam mechanism has the first rotary part interlocked to the output shaft of the actuator and a response part in response to the rotary part to turn the air mixing shutter. When the output shaft is turned within a predetermined rotary range c set narrower that the entire rotary range of the output shaft, the air mixing shutter can be turned between full cooler and heater positions. The speed setting mechanism brings the blower to a low speed operation when the rotary angle of the output shaft falls within the rotary range c and to a high speed operation when the rotary angle of the output shaft falls outside the rotary range c. The air mixing shutter is terned between full cooler and heater positions within the rotary range c that is set narrower than the entire rotary range of the output shaft. During this period, the blower is held at low speeds. When the rotary position of the output shaft falls outside the rotary range c, the air mixing shutter is held at the full cooler or heater position, while the speed setting mechanism is operated to bring the blower from the low to the high speed operation.

6 Claims, 9 Drawing Figures

APPARATUS FOR CONTROLLING VEHICLE AIR CONDITIONER

BACKGROUND OF THE INVENTION

1. Field of the Invention

This invention relates to vehicle air conditioners, more particularly to an apparatus for controlling a vehicle air conditioner.

2. Description of the Prior Art

Some of the air conditioners for vehicles have an automatic temperature control system that controls the blower speed based on the total signal TO, which is derived from the vehicle interior temperature Tr, the outside temperature Ta, the set temperature Td, and the sunlight temperature Ts, and the opening of the air mixing shutter. As the straight line N of FIG. 9 shows, the air mixing shutter of this automatic temperature control system is movable from a full cooler position FC to a full heater position FH in the entire rotary range a of an actuator output shaft. As the line B shows, the blower speed is simultanesouly controlled by a switching mechanism among low L, medium low ML, medium high MH, and high speeds H. See Japanese Pat. Kokai No. 58-209,609.

In the above control system, however, when the air mixing shutter is slowly turned from the middle position a1 to the full cooler FC or heater position FH, the blower is switched from the low speed to the high speed to increase the air flow before the air mixing shutter reaches the full cooler FC or heater FH position. As a result, the people in the vehicle have felt uncomfortable.

SUMMARY OF THE INVENTION

It is an object of the invention to provide an apparatus for controlling a vehicle air conditioner so that the people in the vehicle may be more comfortable than before.

Another object of the invention is to provide an apparatus for controlling a vehicle air conditioner that has the improved cooling or heating effect.

Still another object of the invention is to provide a simple apparatus for controlling a vehicle air conditioner at low cost.

Yet another object of the invention is to provide a reliable apparatus for controlling a vehicle air conditioner.

According to one aspect of the invention there is provided an apparatus for controlling a vehicle air conditioner having a blower that when the air mixing shutter is placed between the full cooler and heater positions, controls the blower to be run at low speed so as to eliminate a strong blast of hot or cold air, thus preventing the people in the vehicle from being uncomfortable.

In accordance with another aspect of the invention there is provided an apparatus for controlling a vehicle air conditioner having a blower that when the air mixing shutter reaches the full cooler or heater position, controls the blower to be run at high speed so as to increase the flow of hot or cool air, thus producing a satisfactory heating or cooling effect.

According to still another aspect of the invention there is provided an apparatus for controlling a vehicle air conditioner comprising a cam mechanism for transmitting the rotary power of an actuator to the air mixing shutter so as to control the shutter opening at low costs.

In accordance with yet another aspect of the invention there is provided an apparatus for controlling a vehicle air conditioner comprising cam means interlocked to the actuator so as to control the mechanism for setting the blower speed thereby to eliminate the present complex electrical circuit for controlling the blower speed, thus increasing its reliability.

The above and other objects, features, and advantages of the invention will become more apparent from the following description when taken in conjunction with the accompanying drawings.

DESCRIPTION OF THE PREFERRED EMBODIMENTS

Figure 1:
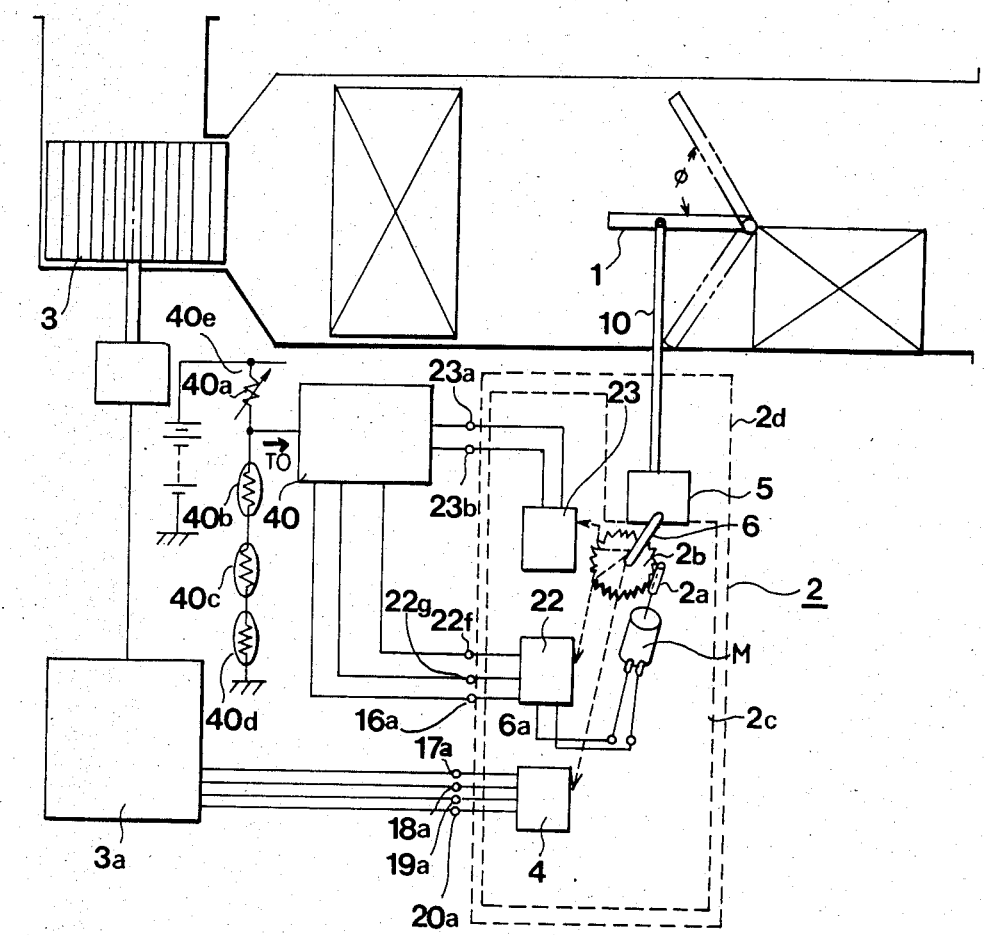
FIG. 1 is a block diagram of a vehicle air conditioner controlling apparatus according to the invention.

Referring now FIG. 1 there is shown a vehicle air conditioner controlling apparatus according to the invention, which includes an actuator 2 consiting of a motor M, an output shaft 6 turned by the motor through a pinion 2a and a gear wheel 2b, a motor case 2c, and an outer casing 2d, and a switching mechanism 4 interlocked with the output shaft 6 for controlling a blower driving circuit 3a, a cam mechanism 5 for transmitting power from the output shaft 6 to an air mixing shutter 1, a motor driving circuit 22, and a potentiometer 23. The switching mechanism 4 is housed in the motor case 2c and interlocked with the output shaft 6 as described below.

Figure 2:
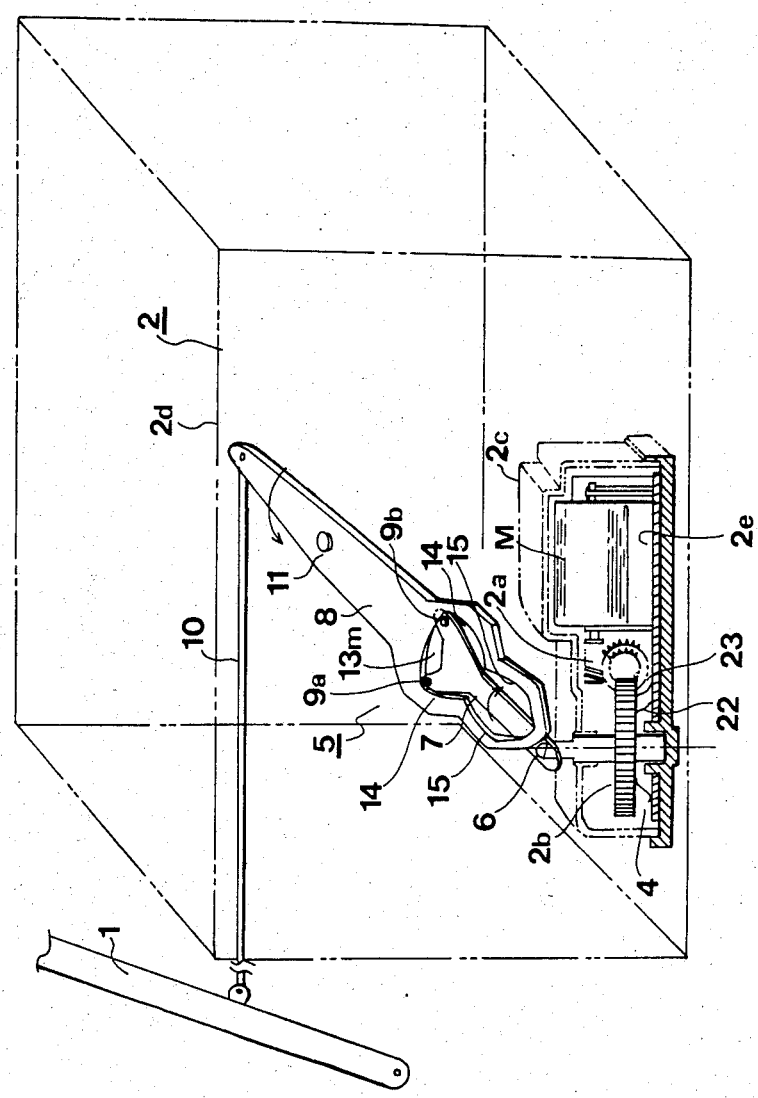
FIG. 2 is a perspective view of the cam mechanism of an actuator according to the invention.
Figure 3:
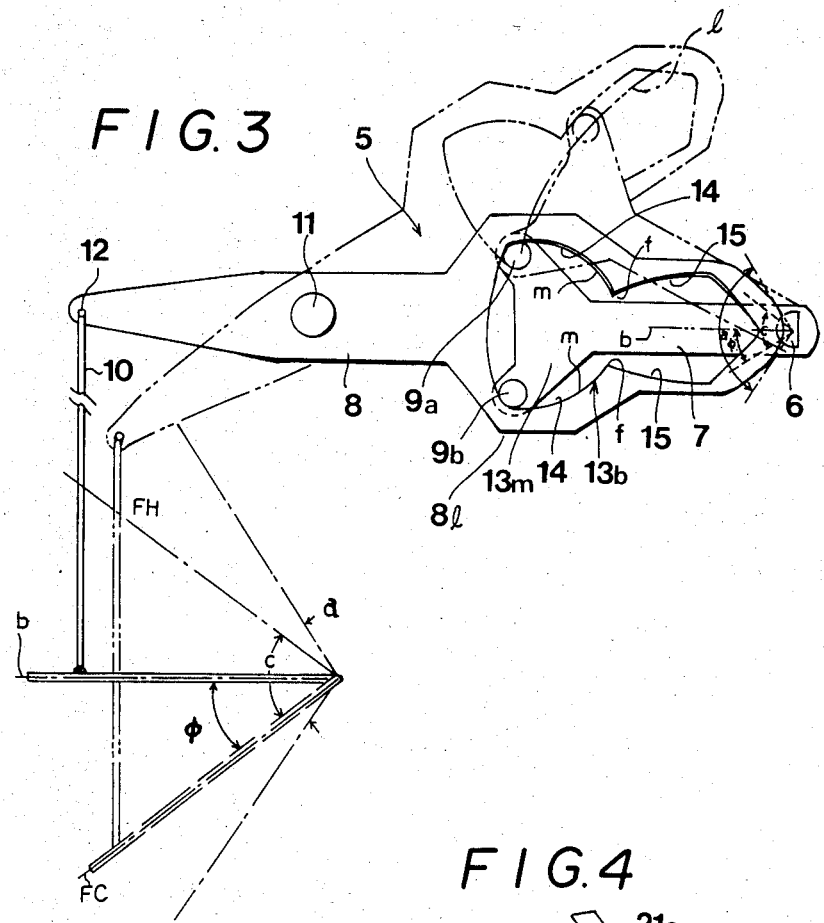
FIG. 3 is an enlarged top view of the cam mechanism of FIG. 2.

As FIGS. 2 and 3 show, the cam mechanism 5 consists of a T-shaped movable member 7 secured at an end to the output shaft 6 and a flat movable or response member 8 slidably linked to the T-shaped member 7 for controlling the opening of the air mixing shutter 1. These first and second rotatable members 7 and 8 are arranged so that the air mixing shutter 1 may be turned to the full cooler FC or full heater FH position within a predetermined rotary range c in the middle of the total rotary range a of the output shaft 6.

Specifically, the first rotatable member 7 is secured at one end to the output shaft 6 and has at its free end a pair of driving pins 9a and 9b as shown in FIG. 3. The second rotatable member 8 is supported near its midpoint on a pivot 11 and rotatably connected at one end to a linkage bar 10 with a pin 12 and has at the other end a pair of cam surfaces 13a and 13b on which the driving pins 9a and 9b slide. The second rotatable member 8 has a pair of opposite walls m defining an opening 13m in its expanded area 81, each consisting of a driving cam face 14 close to the pivot 11 and an escape cam face 15 next to the driving cam face 14.

When the first rotatable member 7 is turned clockwise the pin 9a slides along the cam surface 13a, while when the first member 7 is turned counterclockwise, the pin 9b slides along the cam surface 13b. The driving cam face 14 is shaped so that when the first member 7 is turned clockwise (or counterclockwise), the pin 9a (or 9b) slides along the cam surface 13a (or 13b), turning the second member 8 about the pivot 11 counterclockwise (or clockwise).

However, the second member 8 is turned only when the first member 7 is turned within the rotary range c. The escape surface 15 is curved concentrically with the locus 1 of the driving pin 9a or 9b from the end point f of the driving cam face 14. Consequently, the rotary range of the second member 8 is smaller than that of the first member 7 that is equal to the entire rotary range a of the output shaft 6, thus limiting the rotation of the air mixing shutter 1 to the rotary range c. When the first member 7 is turned all the way to an end of the rotary range a, the second member 8 is turned until the end of the range c, when the driving pin 9a or 9b reaches the end of the driving cam face 14, to bring the air mixing shutter 1 to either the full cooler FC or full heater FH position. However, after the driving pin 9a or 9b passes the driving cam face 14, the second member 8 is no longer turned, thus keeping the air mixing shutter 1 at the full cooler or heater position.

Figure 6:
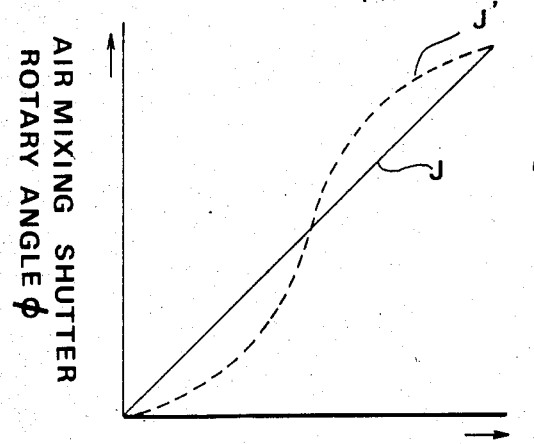
FIG. 6 is a graph showing the relationship between the rotary angle of the output shaft and the rotary angle of the air mixing shutter.

The driving cam surface 14 is shaped so that the relationship between the rotary angle $\theta$ of the output shaft 6 and the rotary angle $\phi$ of the air mixing shutter 1 may be linear as shown by the solid line J in FIG. 6. In other words, the rotary angle $\phi$ of the air mixing shutter 1 increases linearly while the driving pin 9 slides against the driving cam face 14. If the driving cam face 14 is shaped straight, the rotary angle $\phi$ of the air mixing shutter 1 increases along the dotted curve J', thus failing to control accurately the ratio of cold and hot air mixed.

Figure 4:
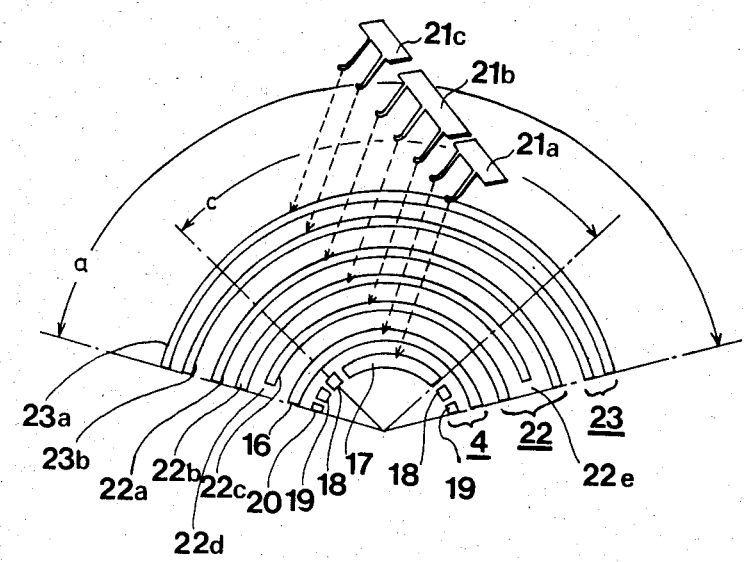
FIG. 4 illustrates the relationship between the movable contacts of a gear wheel and the fixed contacts on which the movable contacts are slidable.
Figure 5:
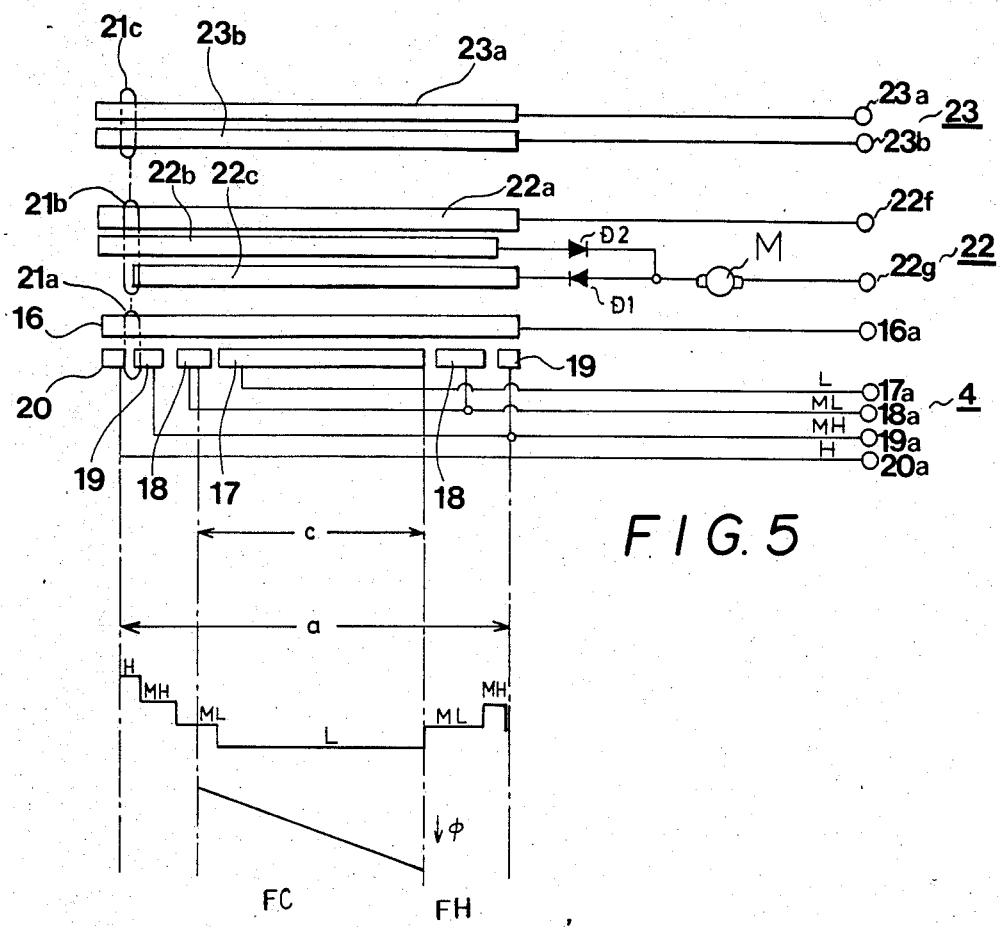
FIG. 5 shows the electrical connections to the contacts of FIG. 4 and the characteristic diagram of the blower and the air mixing shutter.

As FIGS. 4 and 5 show, the switching mechanism 4 consists of a narrow common contact 16 formed on a printed board 2e, which is mounted on the base of a motor case 2c (FIG. 2), a low speed driving contact 17, a pair of medium low speed driving contacts 18 placed on opposite sides of the contact 17, a pair of medium high speed driving contacts 19 placed next to the contacts 18, a high speed driving contact 20 placed next to the contact 19 on the cooler side, and a movable contact 21a slidable on the above contacts when the output shaft 6 is turned. This movable contact is formed on the backside of a gear wheel 2b (FIG. 2) so that it may come into contact with the above common contact 16 and the other contacts 17, 18, and 20.

The low speed driving contact 17 is formed along the circular locus about the output shaft 6 in such a length that it may keep contact with the movable contact 21a while the air mixing shutter 1 is within the range c. This low speed driving contact is designed so that when the rotary position of the output shaft 6 is within the rotary range c of the air mixing shutter 1, a low speed setting signal L may be generated across terminals 16a and 17a so as to drive the blower 3 at low speeds. That is, in response to this signal L, the driving circuit 3a drives the blower 3 at low speeds while the air mixing shutter is within the rotary range c.

When the output shaft 6 rotates beyond the range c, the movable contact 21a comes into contact with the medium low speed driving contacts 18, medium high speed driving contacts 19, and high speed driving contact 20, in this order, generating medium low speed setting signal ML, medium high speed setting signal MH, and high speed setting signal H across the terminal 16a and terminals 18a, 19a, and 20a, respectively. Consequently, the blower 3 is switched over to the high speed operation at the high speed setting signal H.

The motor driving circuit 22 for controlling the output shaft 6 in the entire rotary range a has a common contact 22a, and sliding contact 22b and 22c formed on the print board 2e in concentric form. The common contact 22a is formed over the entire rotary range a, but the sliding contacts 22b and 22c are cut slightly short at one end but different sides to form cuts 22d and 22e, respectively. Consequently, when the movable contact 21b reaches the cut 22d, the current flowing from a terminal 22g through the motor M, a diode D1, the contacts 22c and 21b, the common contact 22a, to a terminal 22f is cut off, bringing the motor M to a stop. When the current flows in the above path between the terminals 22f and 22g in the opposite direction, the contact 21b is reversed toward the cut 22e. When the contact 21b reaches the cut 22e, the above reverse current is cut off, similarly bringing the motor M to a stop. In this way, the rotary range of the output shaft 6 is limited to a.

The potentiometer 23 is provided to sense the opening of the air mixing shutter 1. In consists of a slide contact 23a and a resistor 23b formed on the print board in concentric form, and a movable contact 21c formed on the gear wheel 2b, and produces across the terminals 23a and 23b an output signal corresponding to the position of the movable contact 21c. This output signal is fed to a control circuit 40 where it is compared with a target signal corresponding to the total signal TO so as to bring the motor to a halt at the target position. These switching mechanism 4, motor driving circuit 22, and potentiometer 23 are arranged relative to the rotary direction of the gear wheel 2b.

As FIG. 1 shows, the input of control circuit 40 is connected to the junction of a temperature setting device 40a placed on somewhere easy for the driver to operate and a series circuit of an inside sensor 40b, an outside sensor 40c, and a sunlight sensor 40d. The total signal TO to the control circuit 40 is given by the following equation:

$$TO = Td - (Tr + Ta + Ts)$$

wherein Td is the desired temperature set with the setting apparatus 40a, Tr is the inside temperature of the vehicle sensed by the inside sensor 40b, Ta is the outside temperature sensed by the outside senstor 40c, and Ts is the sunlight temperature sensed by the sunlight sensor. The control circuit 40 seeks the target signal corresponding to the target position of the actuator 2 in response to the above total signal TO and supplies power through the driving circuit 22 to the motor M for rotation so that the difference between the above target signal and the signal from the potentio meter 23 corresponding to the position of the output shaft 6 may become zero, thereby to bring the rotary angle of the output shaft 6 to the target positon. When the total signal TO is very large or small, the rotation of the output shaft is limited to the afore-mentioned range a by the driving circuit 22.

In this embodiment, the output shaft 6 of the actuator 2 is turned clockwise or counterclockwise within the total rotary range a in response to the total signal TO. The second rotary member 8 is turned about the pivot 11 by the driving cam face 14 within the rotary range c in the middle of the entire rotary range a toward the full cooler or full heater side to bring the air mixing shutter to the full cooler FC or full heater position FH. While the air mixing shutter 1 is turned toward the full cooler FC or full heater position FH, the movable contacts 21 of the switching mechanims 4 is sliding on the low speed driving contact 17 to drive the blower 3 at low speeds. When the rotation of the output shaft 6 exceeds the rotary range c, the driving pin 9 of the first movable member 7 enters the escape cam face 15 of the second rotary member 8 having a certain curvature about the output shaft 6. Consequently, the second rotary member 8 is no longer turned thereby to hold the air mixing shutter 1 at the full cooler FH or full heater position FH.

The movable contact 21a of the switching mechanism 4, on the other hand, continues to slide on the medium low speed driving contact 18, medium high speed driving contact 19, and high speed driving contact 20 to switch the blower to the high speed side. Since the rotary angle $\phi$ of the air mixing shutter 1 is a linear function of the rotary angle $\theta$ of the output shaft 6 as shown at J in FIG. 6, the control program becomes simpler and the control accuracy is improved.

Figure 7:
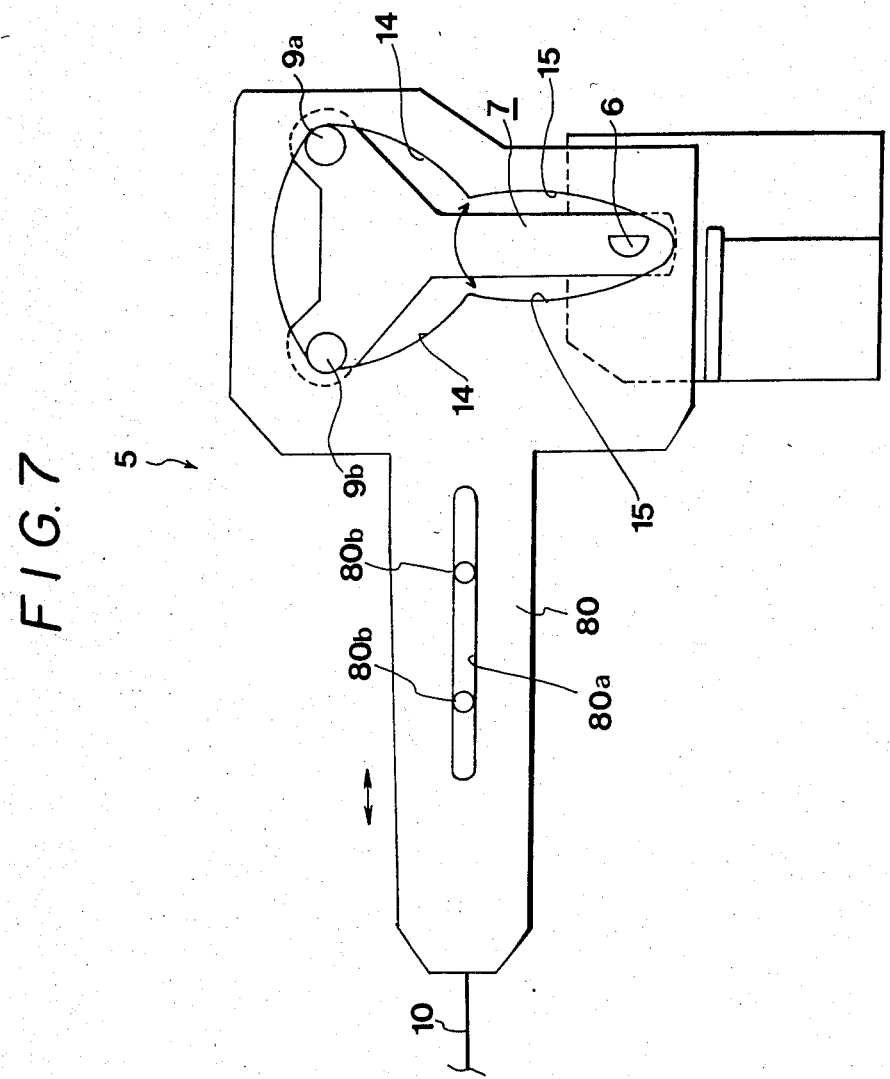
FIGS. 7 and 8 are top views of other embodiments of the vehicle air conditioner controlling apparatus according to the invention.

As FIG. 7 shows, the second rotatable member 8 may be replaced by a response member 80 with a slot 80a in which a pair of guide pins 80b are placed to ensure linear motion of the response member 80.

Figure 8:
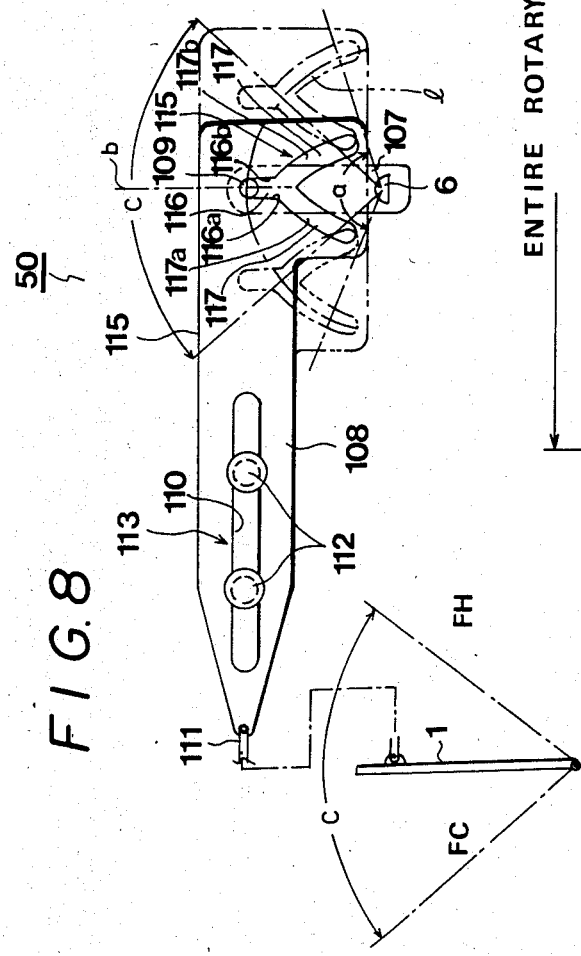
Figure 9:
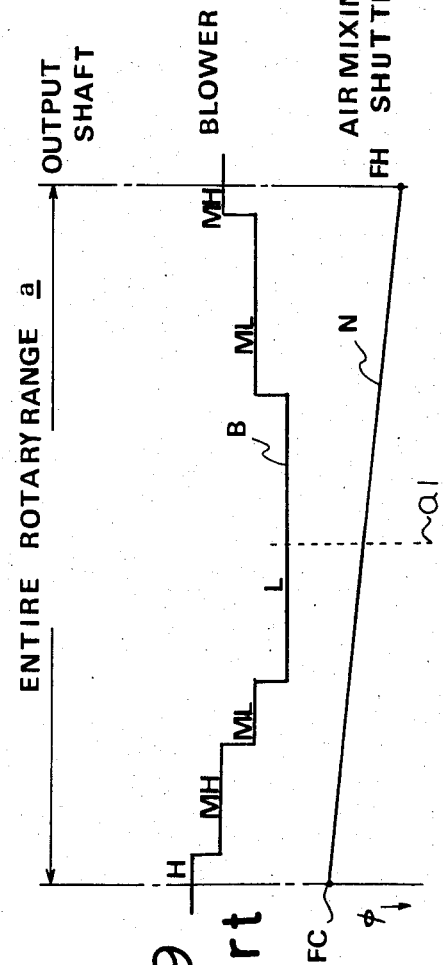
FIG. 9 is a graph showing the relationship between the rotation of the output shaft and the blower speed or the air mixing shutter opening of the prior art.

FIG. 8 illustrates still another apparatus for controlling a vehicle air conditioner embodying the present invention. The cam mechanism 50 for transmitting the rotary power of the output shaft 6 to the air mixing shutter 1 consists of a rectangular rotary member 107 interlocked to the output shaft 6 and a response member 108 slidably connected to the rotary member 107 for linear motion to turn the air mixing shutter 1. These rotary member 107 and response member 108 are arranged so that the air mixing shutter 1 may be at the full cooler FC or full heater FH position within the rotary range c in the middle of the entire rotary range a of the output shaft 6.

More specifically, an end of the rotary member 107 is secured to the output shaft 6 of the actuator 2, and the free end is provided with a driving pin 109. The response member 108 has in its middle a slot 110 in which a guide mechanism 113 consisting of a pair of guide pins 112 is placed so as to allow linear motion of the response member 108. An end of the response member 108 is connected to the air mixing shutter 1 through a link 111. The other end of the response member 108 has a cam opening 115 in which the driving pin 109 is placed. This cam opening has a driving cam slot 116 extending in the direction perpendicular to the lengthwise direction of the response member 108 and a pair of circular escape cam slots 117 branching from the end of the driving cam slot 116 toward opposite sides.

When the output shaft 6 rotates counterclockwise (or clockwise), the driving pin 109 slides along the straight cam face 116a (or 116b) of the driving cam slot 116 to move the response member 108 toward FC (or toward FH) in straight line by means of the guiding mechanism 113 that consists of the slot 110 and guide pins 112. The escape cam faces 117a and 117b of the escape cam slot 117 are shaped in the form of an arc corresponding to the locus of the driving pin 109 about the output shaft 6. Consequently, when the rotary member 107 rotates counterclockwise (or clockwise) beyond the rotary range c, the driving pin 109 comes off from the driving cam face 116a (or 116b) and slides along the circular escape cam face 117a (or 117b), exerting no driving force on the cam face so that the response member 108 is no longer moved. Thus, the air mixing shutter is held at the full cooler FC (or full heater FH) position.

As has been described above, with the controlling apparatus according to the invention, while the air mixing shutter is turned to the full cooler or heater position, the blower may be kept at low speed by means of the cam mechanism for transmitting the rotary power of the actuator output shaft to the air mixing shutter, so that the amount of air blown into the vehicle interior is held low and constant, thus eliminating rapid change in the interior temperature and ensuring comfort of the passengers.

What is claimed is:

1. An apparatus for controlling a vehicle air conditioner having an air mixing shutter, an actuator having an output shaft for turning the air mixing shutter, a blower, and a blower speed setting mechanism in response to the actuator for controlling the blower speed between low and high speed operations; which comprises:

a cam mechanism consisting essentially of:
a rotatable member interlocked to the output shaft of said actuator; and
a response member slidably engaged with said rotatable member for turning said air mixing shutter;
said rotatable and response members being arranged in such a manner that said air mixing shutter may be turned between a full cooler position and a full heater position within a predetermined rotary range c in the middle of an entire rotary range a of said output shaft;
said speed setting mechanism being arranged so as to bring said blower to a low speed operation when the rotary angle $\theta$ of said output shaft is within said rotary range c and to a high speed operation when the rotary angle $\theta$ falls outside said rotary range c.

2. An apparatus for controlling a vehicle air conditioner as recited in claim 1, wherein said cam mechanism is arranged in such a manner that the rotation of said air mixing shutter is linearly related to the rotation of said output shaft.

3. An apparatus for controlling a vehicle air conditioner as recited in claim 1, wherein said cam mechanism comprising:

a rotatable member (7) secured at an end to said output shaft (6) and provided at the free end with a pair of driving pins (9a and 9b); and
a response means (8) pivotally connected at an end to said air mixing shutter (1) through a link (10) and provided at the other end an opening (13m) in which said driving pins are placed;
said opening having a pair of opposite driving cam faces (14) against which said driving pin (9a or 9b) slides to exert a force on the cam face when said rotatable member turns within said rotary range c and a pair of opposite escape cam faces (15) along which said driving pin (9a or 9b) slides but exerts no force on the cam face when said rotatable member turns beyond said rotary range c.

4. An apparatus for controlling a vehicle air conditioner as recited in claim 3, wherein said response member is supported at a pivot (11) so that it may be turned when said driving pin (9a or 9b) slides against said driving cam face (14) and held stationary when said driving pin (9a or 9b) slides along said escape cam face (15).

5. An apparatus for controlling a vehicle air conditioner as recited in claim 3, wherein said response means consisting esentially of:
- a response member (80) having a slot (80a) lengthwise; and
- a pair of guiding pins (80b) placed in said slot so that said response member may be moved in straight line when said driving pin (9a or 9b) slides against said driving cam face (14) and is held stationary when said driving pin (9a or 9b) slides along said escape cam face (15).

6. An apparatus for controlling a vehicle air conditioner as recited in claim 1, wherein said cam mechanism comprising:
- a rotatable member (107) secured at an end to said output shaft (6) and provided at the free end with a driving pin (109); and
- a movable member (108) pivotally connected at an end to said air mix shutter (1) through a link (111) and provided with a cam opening (115) in which said driving pin (109) is placed;
- said cam opening having a pair of driving cam faces (116a and 116b) for holding said driving pin between them so that said driving pin may exert a force on said cam face when said rotatable member is turned within said rotary range c and a pair of escape cam faces (117a and 117b) along which said driving pin slides, exerting no force on the cam face when said rotatable member is turned beyond said rotary range c.

* * * * *